United States Patent
Bartek et al.

(10) Patent No.: US 8,932,371 B2
(45) Date of Patent: Jan. 13, 2015

(54) PROCESS FOR PREPARING A FLUIDIZABLE BIOMASS-CATALYST COMPOSITE MATERIAL

(75) Inventors: Robert Bartek, Centennial, CO (US); Dennis Stamires, Dana Point, CA (US); Michael Brady, Studio City, CA (US)

(73) Assignee: KiOR, Inc., Pasadena, TX (US)

( * ) Notice: Subject to any disclaimer, the term of this patent is extended or adjusted under 35 U.S.C. 154(b) by 583 days.

(21) Appl. No.: 13/133,828

(22) PCT Filed: Dec. 10, 2009

(86) PCT No.: PCT/US2009/067524
§ 371 (c)(1),
(2), (4) Date: Nov. 22, 2011

(87) PCT Pub. No.: WO2010/068773
PCT Pub. Date: Jun. 17, 2010

(65) Prior Publication Data
US 2012/0060408 A1    Mar. 15, 2012

Related U.S. Application Data

(60) Provisional application No. 61/121,238, filed on Dec. 10, 2008.

(51) Int. Cl.
| | | |
|---|---|---|
| *C10L 1/00* | (2006.01) | |
| *B01J 29/04* | (2006.01) | |
| *B01J 35/00* | (2006.01) | |
| *B01J 31/06* | (2006.01) | |
| *B01J 37/02* | (2006.01) | |
| *B01J 27/08* | (2006.01) | |
| *B01J 29/40* | (2006.01) | |
| *C10L 5/44* | (2006.01) | |
| *C10G 1/08* | (2006.01) | |
| *C10L 9/08* | (2006.01) | |

(52) U.S. Cl.
CPC ... *C10L 5/44* (2013.01); *C10G 1/08* (2013.01); *C10G 1/086* (2013.01); *C10L 9/083* (2013.01); *Y02E 50/10* (2013.01); *Y02E 50/15* (2013.01); *Y02E 50/30* (2013.01); *C10G 2300/1014* (2013.01)

USPC .............. 44/300; 502/150; 502/62; 502/159; 502/151

(58) Field of Classification Search
USPC ........... 44/589, 208, 280, 281, 307, 572, 574, 44/605, 300; 208/408, 415, 420, 426, 429, 208/430, 435; 502/63, 150, 151, 159, 62; 252/373; 201/2.5; 48/62 R; 562/515, 562/607; 585/16, 240, 242
See application file for complete search history.

(56) References Cited

U.S. PATENT DOCUMENTS

| | | | | |
|---|---|---|---|---|
| 4,553,978 | A * | 11/1985 | Yvan ............................... | 44/280 |
| 5,015,366 | A * | 5/1991 | Ruether et al. ................. | 208/408 |
| 2007/0006526 | A1* | 1/2007 | Cullen ........................... | 44/589 |
| 2008/0058197 | A1* | 3/2008 | Liu et al. ......................... | 502/63 |
| 2008/0149896 | A1* | 6/2008 | Lenglet ......................... | 252/373 |

FOREIGN PATENT DOCUMENTS

| | | | |
|---|---|---|---|
| WO | WO2007128799 | * | 11/2007 |
| WO | 2008009643 | | 1/2008 |
| WO | WO2008009643 | * | 1/2008 |

OTHER PUBLICATIONS

International Search Report and Written Opinion for co-pending PCT Application No. PCT/US2009/067524, filed Dec. 10, 2009; Dated Mar. 4, 2010; 7 pages.

* cited by examiner

*Primary Examiner* — Prem C Singh
*Assistant Examiner* — Chantel Graham
(74) *Attorney, Agent, or Firm* — Hovey Williams LLP

(57) ABSTRACT

A process is disclosed for preparing fluidizable particles of a biomass/catalyst composite material. The process comprises the steps of (i) providing a particulate, solid biomass material; (ii) forming a composite of the biomass material and a catalytic material; (iii) subjecting the biomass material to a thermal treatment at a torrefaction temperature at or above 200° C., and low enough to avoid significant conversion of the biomass material to liquid conversion products; and (iv) forming fluidizable particles from the biomass material. Step (ii) may be carried out before or after step (iii).

26 Claims, No Drawings

PROCESS FOR PREPARING A FLUIDIZABLE BIOMASS-CATALYST COMPOSITE MATERIAL

RELATED APPLICATIONS

This application is the national stage application of International Application No. PCT/US2009/067524, filed Dec. 10, 2009, which claims the benefit of and priority to U.S. Provisional Ser. No. 61/121,238, filed Dec. 10, 2008, the entire disclosures of which are incorporated herein by reference.

BACKGROUND OF THE INVENTION

1. Field of the Invention

The invention relates generally to a process for preparing a biomass/catalyst composite material in the form of fluidizable particles, and more particularly to a thermal treatment step for use in such a process.

2. Description of the Related Art

WO 2007/128800 describes a process for catalytic conversion of biomass material. Particles of solid biomass material are brought into intimate contact with a particulate catalytic material. Further processing of the composite requires reduction of the particle size of the biomass material. Due to the resilient nature of biomass material such particle size reduction requires significant amounts of mechanical energy.

Bridgeman et al., Fuel 87 (2008) 844-856, describes a torrefaction process wherein reed canary grass, wheat straw and willow are treated to enhance the solid fuel qualities and combustion properties of these biomass materials. Torrefaction is defined as "a thermal treatment that occurs in an inert atmosphere. It removes moisture and low weight organic volatile components and depolymerizes the long polysaccharide chains, producing a hydrophobic solid product with an increased energy density and greatly increased grindability." According to this publication, the material is particularly suitable for co-firing with coal in existing power stations.

Gómez et al., J. Anal. Appl. Pyrolysis 80 (2007) 416-426, describes a thermogravimetric/mass spectrometry study of woody residues and an herbaceous energy crop (artichoke thistle). Samples were heated to temperatures up to 800° C. The publication attempts to simplify the large data set of results by applying a Principal Component Analysis (PCA). Inorganic matter present in the samples appeared to have a catalytic effect on the charring reaction.

Bergman et al., in a paper presented at "The 2$^{nd}$ World Conference and Technology Exhibition on Biomass for Energy, Industry and Climate Protection" in Rome, Italy, 10-14 May 2004, report on the effects of torrefaction on the grindability of biomass. The paper defines torrefaction as "a thermal treatment at a temperature of 200 to 300° C., at near atmospheric pressure and in the absence of oxygen." The paper concludes that torrefaction may contribute to the technical and economic feasibility of entrained-flow gasification of biomass using existing conventional feeding technology.

These publications do not address the need for preparing liquid fuel products from biomass material.

Thus, there is a particular need for using torrefaction in preparing solid biomass for catalytic conversion to liquid products. There is a further need for preparing solid biomass material for conversion in a catalytic process involving a fluidized bed reactor.

BRIEF SUMMARY OF THE INVENTION

The present invention addresses these problems by providing a process for preparing a solid biomass material for a biocatalytic cracking process, said process for preparing comprising the steps of (i) providing a particulate, solid biomass material; (ii) forming a composite of the biomass material and a catalytic material; (iii) subjecting the biomass material to a thermal treatment at a torrefaction temperature at or above 200° C., and low enough to avoid significant conversion of the biomass material to liquid conversion products; and (iv) forming fluidizable particles from the biomass material.

Another aspect of the invention comprises a method for converting the fluidizable particles in a fluidized bed reactor.

DESCRIPTION OF ILLUSTRATIVE EMBODIMENTS

The process of the present invention converts a solid biomass material to fluidizable biomass/catalyst composite particles. The process comprises the steps of (i) providing a particulate, solid biomass material; (ii) forming a composite of the biomass material and a catalytic material; (iii) subjecting the biomass material to a thermal treatment at a torrefaction temperature at or above 200° C., and low enough to avoid significant conversion of the biomass material to liquid conversion products; and (iv) forming fluidizable particles from the biomass material.

The term "liquid conversion products" refers to organic compounds resulting from the conversion of biomass that are liquid at room temperature and contain 4 or more carbon atoms.

Any biomass material may be used in the process of the invention. Examples include food crops, such as corn and rape seed; energy crops, such as switch grass; aquatic biomass, such as algae; agricultural waste; and forestry waste. As the ultimate purpose of the invention is to provide liquid fuel materials, it is desirable to use biomass material that is unsuitable for human consumption. Food crops are therefore less preferred sources of biomass material for use in the process of the invention.

Preferred for use in the process is biomass material comprising both cellulose and lignin, referred to herein as "lignocellulosic biomass material". Preferred is biomass material selected from the group consisting of wood, straw, grass, bagasse, corn stover, grasses, and mixtures thereof. Most preferred are wood and straw.

Step (iii) is carried out either in an inert gas atmosphere, or in a reducing gas atmosphere. Examples of suitable inert gases include nitrogen, carbon dioxide, and steam. Examples of suitable reducing gases include hydrogen, gaseous hydrocarbons, such as methane and ethane, and carbon monoxide.

Step (iii) is not intended to effect significant conversion of the biomass material. If a reducing gas atmosphere is used in step (iii), the purpose of doing so is to effect a modest reduction in the oxygen content of the biomass material, and/or to open up the structure of the biomass material so as to make it more susceptible to conversion in a subsequent process.

In one embodiment of the invention the catalytic material is an acidic material. Suitable acidic materials include mineral acids, such as nitric acid, hydrochloric acid, phosphoric acid, and sulfuric acid. Solid acidic materials may also be used, in particular zeolites. ZSM-5, in particular HZSM-5, is preferred.

In another embodiment the catalytic material is a basic material. It has been found that, in subsequent catalytic pyrolysis, basic catalysts generally produce a bio-oil of better quality than do acidic catalysts.

Particularly preferred are catalytic materials from the group consisting of alkali metal oxides and hydroxides; alkali metal carbonates; earth alkaline metal oxides and hydroxides; earth alkaline metal carbonates; layered mixed hydroxides; cationic layered materials; hydrotalcite and hydrotalcite-like materials; and mixtures thereof.

In one embodiment of the invention step (ii) is carried out before step (iii), that is, a composite of the biomass material and the catalytic material is formed before the biomass material (in this case together with the catalytic material) is subjected to the torrefaction temperature. It will be understood that step (ii) may be carried out immediately prior to step (iii), or there may be one or more intermediate steps, such as drying and/or storing.

The pre-torrefaction biomass material is relatively soft as compared to the catalytic material. As a result, a solid catalytic material readily penetrates the biomass material if mechanical action is exercised on a mixture of the two materials, such as milling, grinding, or kneading.

Mechanical treatment, such as co-milling, co-grinding or co-kneading, is preferred if the catalytic material is insoluble. If the catalytic material is soluble it may be dissolved in a suitable solvent, and the resulting solution used to impregnate the biomass material.

In another embodiment of the invention, step (iii) is carried out before step (ii), that is, the biomass material is subjected to torrefaction before the composite of the biomass material and the catalytic material is formed. It will be understood that, in this embodiment, step (iii) may be carried out immediately before step (ii), or there may be one or more intermediate steps, such as cooling, grinding, storing, and the like.

As torrefaction makes the biomass material brittle, it may prove difficult to form a composite of torrefied biomass material and insoluble catalyst particles by mechanical action, such as grinding, milling, and the like. Torrefaction also tends to make the biomass material hydrophobic, which may make it difficult to impregnate the material with a solution of catalytic material, if the solvent is an aqueous liquid. For these reasons it is often preferred to spray a slurry or a solution of catalyst material onto particles of un-torrefied biomass material.

In yet another embodiment, steps (ii) and (iii) are carried out simultaneously. For example, particles of biomass material and catalyst particles may be blended at ambient temperature, and heated together to the torrefaction temperature. Preferably the mixture is subjected to agitation while being heated. It is believed that the biomass passes through a gelatinous state, in particular if the torrefaction is carried out in a steam atmosphere, or if sufficient water is present in the biomass material to form a steam atmosphere around the particles. Catalyst particles readily adhere to the biomass particles while the latter pass through a gelatinous state.

During torrefaction, gaseous materials and volatile organic compounds are released from the biomass material. Examples include carbon dioxide, acetaldehyde, formaldehyde, acetic acid, formic acid, methanol, carbon monoxide, and methane. It is desirable to capture these materials as they are released from the biomass. Methane and methanol are suitable fuels, and may be used in the process for heating the biomass to the torrefaction temperature. Carbon monoxide may be used in a subsequent catalytic pyrolysis process as a reducing agent. Acetaldehyde, formaldehyde, acetic acid and formic acid are well known building blocks of valuable organic compounds.

It is generally preferred to avoid producing significant quantities of bio-oil during the torrefaction step. The torrefaction temperature is chosen so as to avoid the formation of significant quantities of organic compounds that are liquid at room temperature, and contain 4 or more carbon atoms. In general, the torrefaction temperature is at or above 200° C. The upper limit varies with the nature of the biomass material (in particular the amount of ash present in the biomass material); whether or not the catalytic material is present in the biomass during the torrefaction step; and, if a catalytic material is present, the nature of the catalytic material. It will be understood that compounds such as formic acid, acetic acid, and propionic acid, which are liquid at room temperature but contain fewer than 4 carbon atoms, may be formed during torrefaction.

In general, the torrefaction temperature of step (iii) is in the range of from 200° C. to 300° C. For many biomass/catalyst combinations the optimum torrefaction temperature is in the range of from 220° C. to 260° C.

The biomass material is subjected to the torrefaction temperature during a time period in the range of from 10 minutes to 12 hours, preferably in the range of from 15 minutes to three hours.

As compared to the biomass starting material, the torrefied material offers several advantages. The torrefied material has a higher density, and greater flowability, making it easier to transport and store. Being more brittle, it is more readily ground to smaller particles. Particles obtained by milling or grinding torrefied material are more round-shaped (i.e., less needle-like) than particles obtained by grinding un-torrefied biomass material. The torrefied material is generally hydrophobic and, as a result, has greater stability to microbial attack.

The ultimate goal of the process of the invention is to make a fluidizable biomass material. In general, step (iv) requires reduction of the particle size of the biomass material. It is advantageous to carry out step (iv) after step (iii), because torrefaction improves the grindability of the biomass material, and the resulting particles are more round-shaped (i.e., less needle-like) than those obtained by grinding un-torrefied biomass material.

It will be understood that step (iv) does not need to be carried out immediately following step (iii), in particular as torrefaction improves the storage properties of the biomass material.

The term "fluidizable particles" as used herein refers to Group A particles and Group B particles according to the Geldart classification (see Geldart, Powder Technology 7, 285-292 (1973)). Preferred are Group A particles. In general, these conditions are met if torrefied biomass material is ground to a particle size range of 10 to 1,000 μm, preferably 30 to 400 μm.

Another aspect of the invention is a catalytic cracking process comprising converting the fluidizable particles made by the present process in a fluidized bed reactor. As catalytic material is already present in the biomass material, it may not be necessary to add an additional catalyst. It may be desirable to add a heat carrier material in order to quickly heat the biomass material to the desired conversion temperature. The heat carrier material may be a particulate catalyst material, a particulate inert material, or a mixture of a particulate catalyst material and a particulate inert material.

The conversion is generally carried out at a temperature above the torrefaction temperature of step (iii), and below 550° C. The preferred catalytic conversion temperature is in the range of from 300° C. to 450° C.

What is claimed is:

1. A process for preparing a solid biomass material for a biocatalytic cracking process, said process for preparing comprising the steps of (i) providing a particulate, solid biomass material; (ii) forming a composite of said biomass material and a catalytic material; (iii) subjecting said biomass material to a thermal treatment at a torrefaction temperature at or above 200° C., and low enough to avoid significant conversion of said biomass material to liquid conversion products, wherein said thermal treatment is carried out in a reducing gas atmosphere; and (iv) reducing the particle size of said biomass material from step (iii) to thereby form fluidizable particles.

2. The process of claim 1 wherein step (ii) is carried out prior to step (iii).

3. The process of claim 1 wherein step (iii) is carried out prior to step (ii).

4. The process of claim 1 wherein step (iii) is carried out in an inert gas atmosphere.

5. The process of claim 1 wherein said reducing gas atmosphere comprises carbon monoxide.

6. The process of claim 1 wherein said catalytic material is an acidic material.

7. The process of claim 6 wherein said catalytic material is a zeolite.

8. The process of claim 7 wherein said zeolite is ZSM-5.

9. The process of claim 1 wherein said catalytic material is a basic material.

10. The process of claim 9 wherein said catalytic material is selected from the group consisting of alkali metal oxides and hydroxides; alkali metal carbonates; earth alkaline metal oxides and hydroxides; earth alkaline metal carbonates; layered mixed hydroxides; cationic layered materials; hydrotalcite and hydrotalcite-like materials; and mixtures thereof.

11. The process of claim 1 wherein said torrefaction temperature of step (iii) is in the range of from 200° C. to 300° C.

12. The process of claim 11 wherein said torrefaction temperature of step (iii) is in the range of from 220° C. to 260° C.

13. The process of claim 1 wherein said solid biomass material is a ligno-cellulosic biomass material.

14. The process of claim 13 wherein said biomass material is selected from the group consisting of wood, straw, grass, bagasse, corn stover, grasses, and mixtures thereof.

15. The process of claim 14 wherein said solid biomass comprises wood.

16. The process of claim 14 wherein said solid biomass comprises straw.

17. The process of claim 1 wherein said composite of biomass material and catalytic material is formed by impregnating said solid biomass material with a solution of catalytic material in a suitable solvent.

18. The process of claim 17 wherein said suitable solvent is an aqueous liquid.

19. The process of claim 1 wherein said composite of biomass material and catalytic material is formed by subjecting said solid biomass to mechanical action in the presence of a particulate catalytic material.

20. The process of claim 19 wherein said mechanical action comprises milling, grinding, extruding, kneading, or a combination thereof.

21. The process of claim 1 wherein, in step (iii), said biomass material is subjected to said torrefaction temperature during a time period in the range of from 10 minutes to 12 hours.

22. The process of claim 21 wherein said time period is in the range of from 15 minutes to 3 hours.

23. Fluidizable particles of a solid biomass material obtained by the process of claim 1.

24. A biocatalytic cracking process comprising converting said fluidizable particles of claim 1 in a fluidized bed reactor.

25. The biocatalytic cracking process of claim 1 wherein said fluidizable particles are converted in said fluidized bed reactor at a conversion temperature in the range of from 300° C. to 450° C.

26. The process of claim 1 wherein said composite of biomass material and catalytic material can be used in hydropyrolysis reactor.

* * * * *